United States Patent
Haik et al.

(10) Patent No.: US 9,932,236 B2
(45) Date of Patent: Apr. 3, 2018

(54) SYSTEM FOR PRODUCING CARBON NANOTUBES FROM COMBUSTION ENGINE EXHAUSTS

(71) Applicant: United Arab Emirates University, Al Ain (AE)

(72) Inventors: Yousef Haik, Al Ain (AE); Saud Aldajah, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 14/166,448

(22) Filed: Jan. 28, 2014

(65) Prior Publication Data

US 2014/0140916 A1 May 22, 2014

Related U.S. Application Data

(63) Continuation-in-part of application No. 13/937,927, filed on Jul. 9, 2013, now abandoned, which is a continuation of application No. 13/624,409, filed on Sep. 21, 2012, now Pat. No. 8,480,992, which is a continuation of application No. 12/496,808, filed on Jul. 2, 2009, now abandoned.

(51) Int. Cl.
| | |
|---|---|
| C01B 32/16 | (2017.01) |
| B82Y 40/00 | (2011.01) |
| C01B 31/02 | (2006.01) |
| B01D 46/00 | (2006.01) |
| B01D 46/42 | (2006.01) |
| B01D 67/00 | (2006.01) |
| B01D 69/10 | (2006.01) |
| B01D 69/12 | (2006.01) |
| B01D 71/02 | (2006.01) |
| B82Y 30/00 | (2011.01) |
| F01N 3/022 | (2006.01) |
| F01N 3/025 | (2006.01) |
| F01N 3/029 | (2006.01) |

(52) U.S. Cl.
CPC ........ *C01B 31/024* (2013.01); *B01D 46/0057* (2013.01); *B01D 46/0063* (2013.01); *B01D 46/42* (2013.01); *B01D 67/0039* (2013.01); *B01D 69/10* (2013.01); *B01D 69/12* (2013.01); *B01D 71/021* (2013.01); *B01D 71/022* (2013.01); *B82Y 30/00* (2013.01); *B82Y 40/00* (2013.01); *C01B 31/0206* (2013.01); *C01B 31/0226* (2013.01); *C01B 31/0233* (2013.01); *F01N 3/022* (2013.01); *F01N 3/025* (2013.01); *F01N 3/029* (2013.01); *B01D 2277/20* (2013.01); *B01D 2279/30* (2013.01); *B01D 2323/08* (2013.01); *C01B 2202/30* (2013.01); *C01B 2202/34* (2013.01); *C01B 2202/36* (2013.01); *F01N 2330/02* (2013.01)

(58) Field of Classification Search
CPC ............................... C01B 32/16; B82Y 40/00
See application file for complete search history.

(56) References Cited

U.S. PATENT DOCUMENTS

| | | | |
|---|---|---|---|
| 5,167,765 A | 12/1992 | Nielsen et al. | |
| 5,755,963 A | 5/1998 | Sugiura et al. | |
| 6,314,722 B1 | 11/2001 | Matros et al. | |
| 7,674,448 B2 | 3/2010 | Fan et al. | |
| 7,935,175 B2 | 5/2011 | Jang et al. | |
| 8,480,992 B2 * | 7/2013 | Haik et al. | 423/445 B |
| 2011/0000198 A1 | 1/2011 | Haik et al. | |
| 2011/0002837 A1 * | 1/2011 | Maghrebi | B01J 31/12 423/447.1 |
| 2013/0022531 A1 * | 1/2013 | Haik | B01D 46/0057 423/447.3 |

OTHER PUBLICATIONS

H. S. Jung et al., Carbon Nanotubes Among Diesel Exhaust Particles: Real Samples or Contaminants?, 63 J. Air Waste Manage. Assoc. 1199-1204 (2013).*
Takayama et al., "Evidence for the Presence of Fullerene in Diesel Soot Using Laser Deposition/Ionization Mass Spectrometry," 54 J. Mass Spectrom. Soc. Jpn. 39-44 (2006).
T Uchida et al., Synthesis of Single-Wall Carbon Nanotubes from Diesel Soot, 45 Jpn. J. Appl. Phys. 8027-8029 (2006).
Patent Cooperation Treaty, "International Search Report," issued in International Application No. PCT/IB2015/01097, by Australian Searching Authority, document of 4 pages, dated Nov. 3, 2015.

* cited by examiner

*Primary Examiner* — Randy Boyer
(74) *Attorney, Agent, or Firm* — Akerman LLP; Michael K. Dixon

(57) ABSTRACT

A filtration system that uses a filter to convert wastes in automotive exhausts into carbon nanotubes is disclosed. Metallic salts, such as iron salts, may be mixed with diesel fuel by way of using algal biodiesel to ensure homogenous suspension of the metallic salts in the diesel fuel. The metallic salts form a suitable catalyst to grow carbon nanotubes on a filter placed in the pathway of the diesel combustion exhaust. The filter surface may be composed of iron of similar catalyst. The filter may be placed along the pathway of exhaust streamlines preferably at an angle of more than 5 degrees and less than 15 degrees. The filter is heated to temperatures in the range of 200-1000 degrees Celsius. The filter described in this invention can work in its own or supplement existing filtration systems. The filtration system may produce a material that is commercially valuable, synthesized carbon nanotubes.

16 Claims, 8 Drawing Sheets

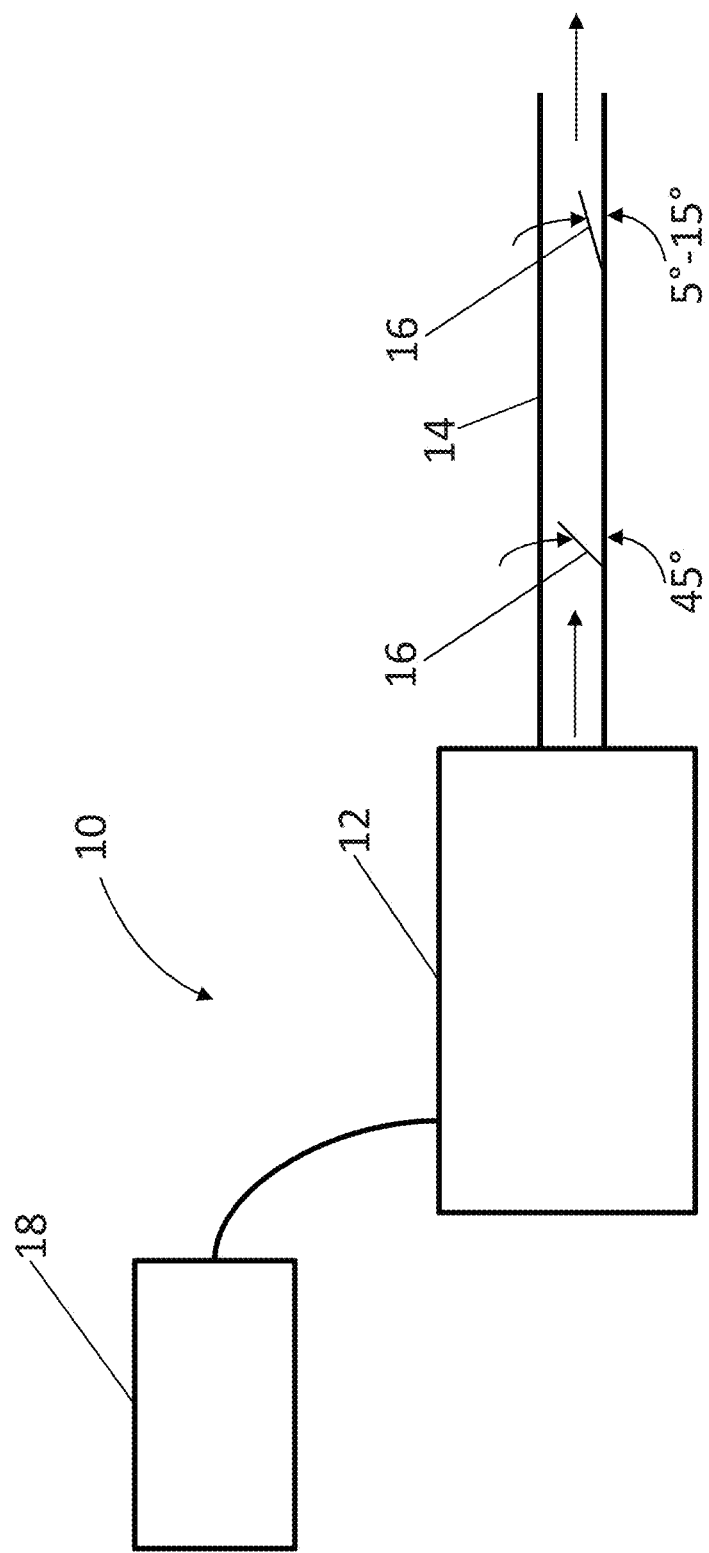

US 9,932,236 B2

SYSTEM FOR PRODUCING CARBON NANOTUBES FROM COMBUSTION ENGINE EXHAUSTS

CROSS-REFERENCE TO RELATED APPLICATION

This patent application is a continuation-in-part of U.S. patent application Ser. No. 13/937,927, filed Jul. 9, 2013, which is a continuation patent application of U.S. patent application Ser. No. 13/624,409, filed Sep. 21, 2012, now U.S. Pat. No. 8,480,992, which is a continuation patent application of U.S. patent application Ser. No. 12/496,808, filed Jul. 2, 2009, now abandon, which are incorporated by reference herein in their entireties.

FIELD OF THE INVENTION

This invention relates to a system and method that converts automotive exhaust waist to carbon nanotubes.

BACKGROUND OF THE INVENTION

Incomplete combustion, particularly in diesel engines, produces black carbon and many hydrocarbon gases that can contribute to global warming and potential health hazards. Oxidation catalysts that convert hydrocarbon and carbon monoxide into carbon dioxide and water are known in the literature. Ceramic filters that are known for their efficiency to remove 90% of the particulates require temperatures at least as high as 500 degrees Celsius and oxygen rich exhaust conditions. Filtration systems adapted to capture particulates have been disclosed in U.S. Pat. Nos. 5,167,765 and 5,755,963. Nonetheless, conventional filters do not teach the conversion of waste from combustion engine exhaust into a commercially viable product.

SUMMARY OF THE INVENTION

A system and method converting exhaust waste of a combustion engine to carbon nanotubes within an exhaust system in fluid communication with the combustion engine is disclosed. In at least one embodiment, the system may include a filter and a process that converts waist exhaust of combustion engines into carbon nanotubes. The combustion engine may be used in numerous applications, such as, but not limited to, being used as an automotive combustion engine. In at least one embodiment, aspects of the system and method include the filter material, treatment of the filter material, alignment of the filter material and process that yields the maximum amount of carbon nanotubes. The system and method may also include use of a fuel 18 with one or more metal salts that once combusted within a combustion engine produce carbon nanotubes downstream of a combustion chamber, such as, but not limited to, within the exhaust system.

In at least one embodiment, the system includes a filter and a process to synthesize carbon nanotubes from automotive engine exhaust waste. In one embodiment, the filter may be composed of iron plates that are polished prior to placement in the exhaust system. In another embodiment, thin, metallic film made from Fe, Al, Ni, and Co may be deposited on metallic or nonmetallic layers and placed in the streamline of the exhaust waste. The system may be installed on currently existing exhaust systems with only minor modifications. The filter of the system may function singularly or in conjunction with other filtration systems. The carbon nanotubes that may form on the filter surfaces are recoverable and may be utilized for many carbon nanotube (CNT) applications.

The method of converting exhaust waste of combustion engines to carbon nanotubes within an exhaust system in fluid communication with the combustion engine may include generating combustion engine exhaust through combustion of a fuel including a metal salt and heating one or more filters to at least 200 degrees Celsius. The filet may be placed downstream of a combustion engine, such as within an exhaust system. One or more metal salts, such as, but not limited to, iron salts, may be suspended in fuel, such as, but not limited to, diesel fuel to provide a catalyst for carbon nanotube formation. The suspension may be formed by introducing one or more metal salts into algal biodiesel or fatty acids containing oil that is mixed in ethanol and then introduced into the fossil fuel diesel to make homogenous suspension. The metal salt increases the formation of carbon nanotubes on the filter.

These and other embodiments are described in more detail below.

BRIEF DESCRIPTION OF THE FIGURES

The accompanying drawings, which are incorporated in and form a part of the specification, illustrate embodiments of the presently disclosed invention and, together with the description, disclose the principles of the invention.

FIG. 8 is a schematic diagram of the system usable to convert exhaust waste of a combustion engine to carbon nanotubes within an exhaust system in fluid communication with a combustion engine.

DESCRIPTION OF THE INVENTION

Figure 1:
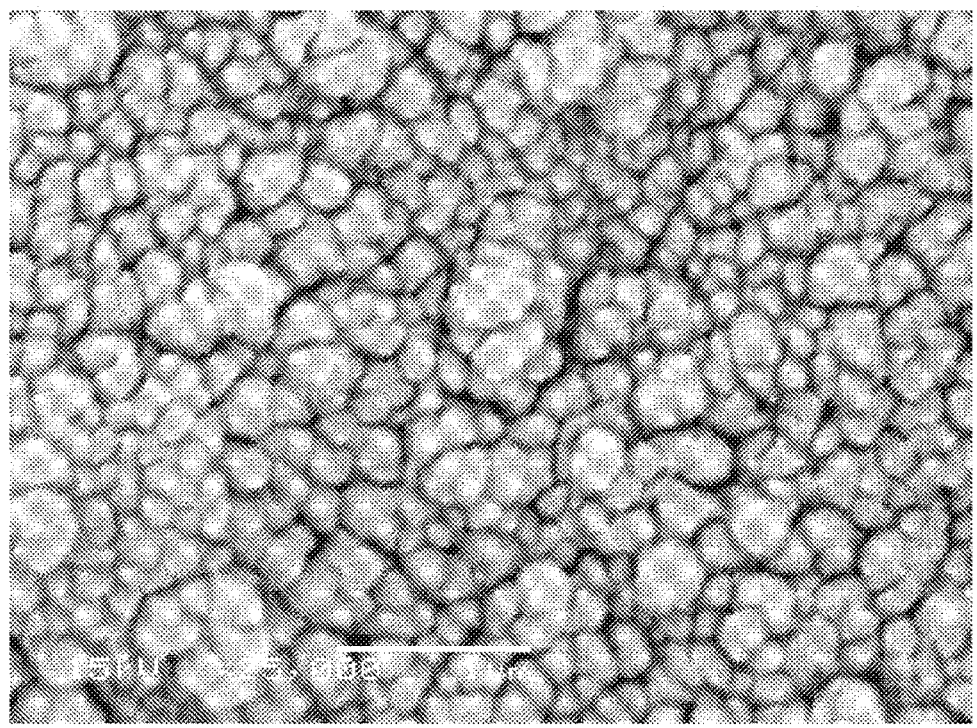
FIG. 1 is a SEM monograph showing the formation of particulates on a polymeric filter placed in the pathway of exhaust.

As shown in FIG. 1-8, a system 10 and method converting exhaust waste of a combustion engine 12 to carbon nanotubes within an exhaust system 14 in fluid communication with the combustion engine 12 is disclosed. In at least one embodiment, the system 10 may include a filter 16 and a process that converts waste exhaust of combustion engines 12 into carbon nanotubes. The combustion engine 12 may be used in numerous applications, such as, but not limited to, being used as an automotive combustion engine. In at least one embodiment, aspects of the system 10 and method include the filter material 16, treatment of the filter material, alignment of the filter material and process that yields the maximum amount of carbon nanotubes. The system 10 and method may also include use of a fuel 18 with one or more metal salts that once combusted within a combustion engine 12 produce carbon nanotubes downstream of a combustion chamber, such as, but not limited to, within the exhaust system 14.

In at least one embodiment, the system 10 may include a filter 16 placed downstream of the combustion engine 12. The filter 16 may be formed from any appropriate material capable of withstanding the environment, such as the heat generated by the combustion engine 12. In at least one embodiment, the filter 16 may be formed from filter material that is thin, such as less than one mm in thickness, and may be formed from a metal, such as but not limited to iron metal. In at least one embodiment, the filter material forming the filter 16 may be formed from pure iron such as, but not limited to, pure iron sheets. In another embodiment, the filters 16 may be formed from carbonated steal with low percentage of carbon, such as, but not limited to, 0.05 or less carbon. In yet another embodiment, a thin layer of iron may be posted on a polymeric or metallic sheet. The thin layer may be produced by one or more physical processes, such as, but not limited to, pulse laser deposition or ablation processes.

In the event of using carbonated steel, or iron, a polishing scheme may be used to expose the iron grains on the surface. Such processes may not be needed for thin layer depositions as described before.

The filter 16 may be positioned in the path of the exhaust waste of a combustion engine, such as an automotive engine. The filter 16 may be placed at an angle below 45 degrees and, in at least one embodiment, may be placed below 15 degrees measured from the streamline of the exhaust waste. In at least one embodiment, the filter 16 may be placed at an angle to the exhaust flow of between 5 degrees and 15 degrees. As such, combustion engine exhaust may be directed past the filter 16 having a surface skewed relative to exhaust flow an angle between 5 degrees and 15 degrees.

Localized heating of the filter 16 or its surrounding is required to activate the carbon nanotubes formation. Though a temperature in the range of 700 degrees Celsius is preferred, temperatures as low as 200 degrees Celsius have shown carbon nanotubes formation. The efficiency of the tube formation is a function of the filter angle and the temperature at the filter location. In at least one embodiment, carbon nanotubes may form on an exposed surface of the filter 16 such that the carbon nanotubes may be formed from multiwall carbon nanotubes having an average diameter of between 20 and 50 nm and average length of between one micrometer and 10 micrometers.

Figure 5:
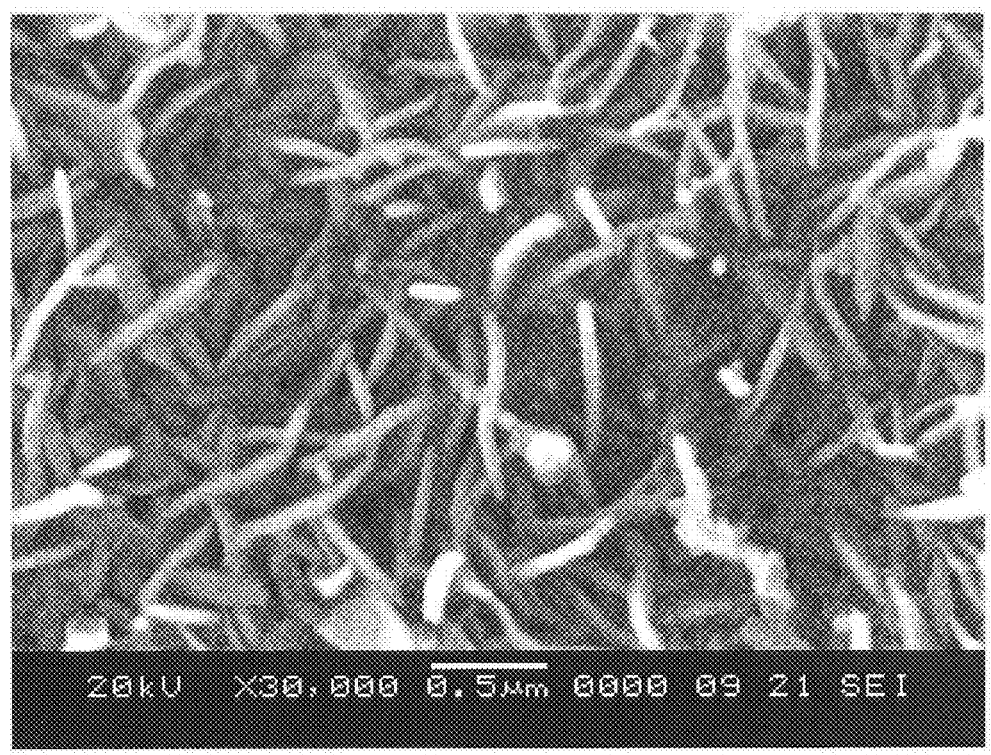
FIG. 5 is a SEM monograph showing the formation of particulates on a filter placed in the pathway of exhaust from combustion of a fuel 18 having iron salt concentration of 2 mg/ml.
Figure 6:
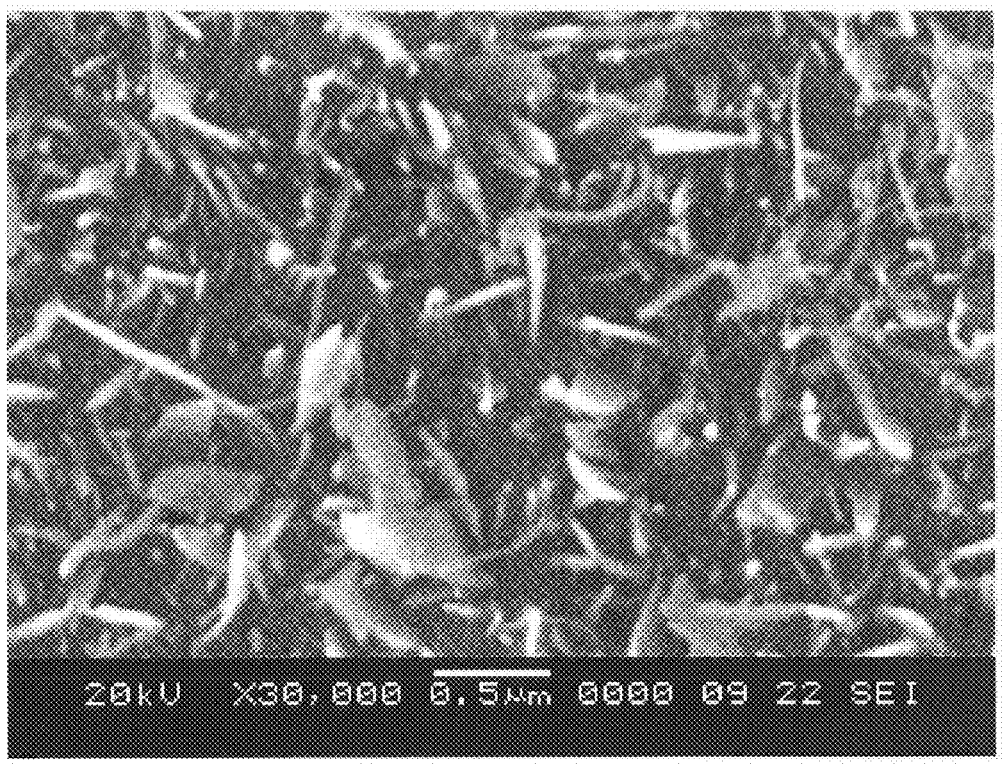
FIG. 6 is a SEM monograph showing the formation of particulates on a filter placed in the pathway of exhaust from combustion of a fuel 18 having iron salt concentration of 1 mg/ml.
Figure 7:
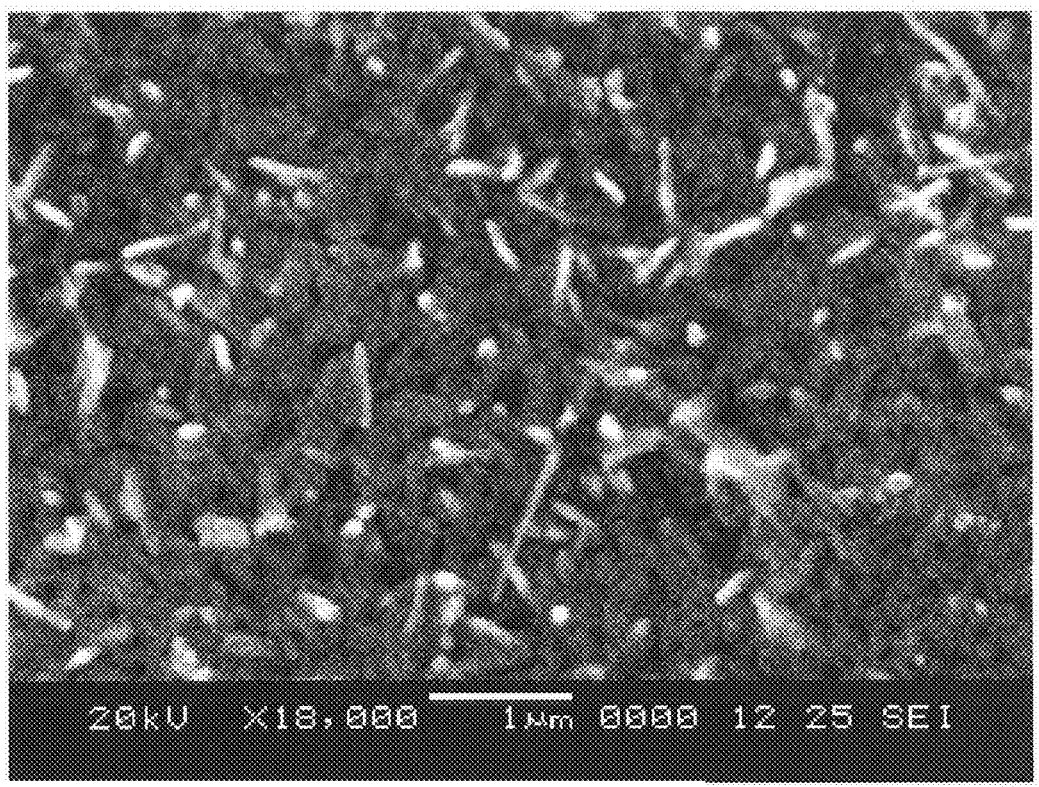
FIG. 7 is a SEM monograph showing the formation of particulates on a filter placed in the pathway of exhaust from combustion of a fuel 18 having iron salt concentration of 0.05 mg/ml.

The method of converting exhaust waste of combustion engines 12 to carbon nanotubes, as shown in FIGS. 5-7, within an exhaust system 14 in fluid communication with the combustion engine 12 includes generating combustion engine exhaust through combustion of a fuel 18 including a metal salt and heating one or more filters 16 to at least 200 degrees Celsius. The method also includes passing combustion engine exhaust past the filter 16 positioned within the exhaust system 14 of the combustion engine 12, wherein carbon nanotubes form on an exposed surface of the filter 16.

In at least one embodiment, the method may include a process for converting diesel engine exhaust gases into carbon nanotubes. As shown in FIG. 8, one or more filters 16 may be placed downstream of the combustion engine 12 in at least a portion of the exhaust gases flowing from the combustion engine 12. The method may include generating combustion engine exhaust through combustion of a fuel 18 including a metal salt whereby the metal salt may be, but is not limited to being, an iron salt. The metal salt may be, but is not limited to being, used in a concentration between about one mg of metal salt/ml of fuel 18 and four mg of metal salt/ml of fuel 18. Concentrations less than this range and without a metallic substrate do not generate carbon nanotubes. In at least one embodiment, the metal salt may have a concentration of two mg of metal salt/ml of fuel 18.

The metal salt may be used together with a fuel 18, such as, but not limited to, diesel fuel 18. In at least one embodiment, at least a portion of the fuel 18 may be an algal biodiesel. In another embodiment, at least a portion of the fuel 18 may be a fossil diesel fuel 18. In yet another embodiment, the fuel 18 may be a mixture of algal biodiesel fuel 18 and fossil diesel fuel 18. The utilization of algal biodiesel fuel 18 promotes formation of carbon nanotubes by suspending the iron salt within the fossil diesel fuel 18. In still another embodiment, the fuel 18 may be a mixture of algal biodiesel fuel 18, ethanol and fossil diesel fuel 18. The fuel 18 may be formed by introducing one or more metal salts into algal biodiesel to form a mixture. The mixture of one or more metal salts into algal biodiesel may then be mixed into the fossil diesel fuel 18 to form a homogenous suspension. The algal biodiesel creates a homogenous suspension of the iron salt in fossil fuel 18 diesel. The presence of the metal salt increases the formation of carbon nanotubes on the filer 16.

In at least one embodiment, the diesel fuel 18 may be formed from a mixture of between one percent and ten percent algal biodiesel fuel 18, between one percent and ten percent ethanol and remainder fossil diesel fuel 18. In another embodiment, the diesel fuel 18 may be formed from a mixture of about five percent algal biodiesel fuel 18, about five percent ethanol and about 90 percent fossil diesel fuel 18. Combustion of fuel 18, such as but not limited to diesel fuel 18, with metal salts, such as, but not limited to one or more iron salts, improves the combustion quality and reduces the formation of soot. The inclusion of biodiesel together with the fossil fuel 18 diesel may help to reduce environmental hazards, such as, but not limited to, $CO(x)$ and $SO(x)$.

Examples

The following examples are not to limit the scope of the invention but to illustrate the invention. A filter made out of a solid structure such as, but not limited to, carbonated steel, was placed in the pathway of a diesel engine exhaust. The engine was allowed to run at normal operation condition for half an hour. The filter was recovered and evaluated using SEM. FIG. 1 shows a monograph of the material collected on the solid filter. It showed clumps of carbon particulates.

Figure 2:
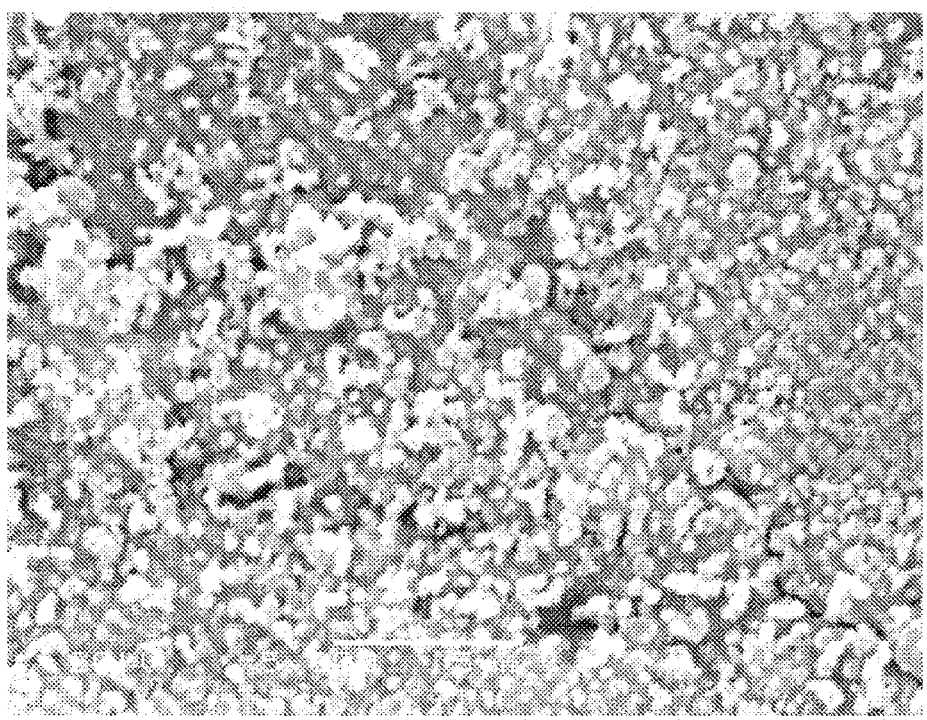
FIG. 2 is a SEM monograph showing the formation of particulates on the filter material in absence of a localized heating.

A filter made out of carbonated steel was polished using techniques known in the literature. The surface was examined using optical microscopy. The grains were clearly shown. The filter was placed in the pathway of a diesel engine exhaust. The engine was allowed to run for half an hour under normal operation conditions. The filter was collected and examined using SEM. FIG. 2 shows SEM monograph of the materials collected on the surface of the filter. It shows clumps of carbonated materials.

Figure 3:
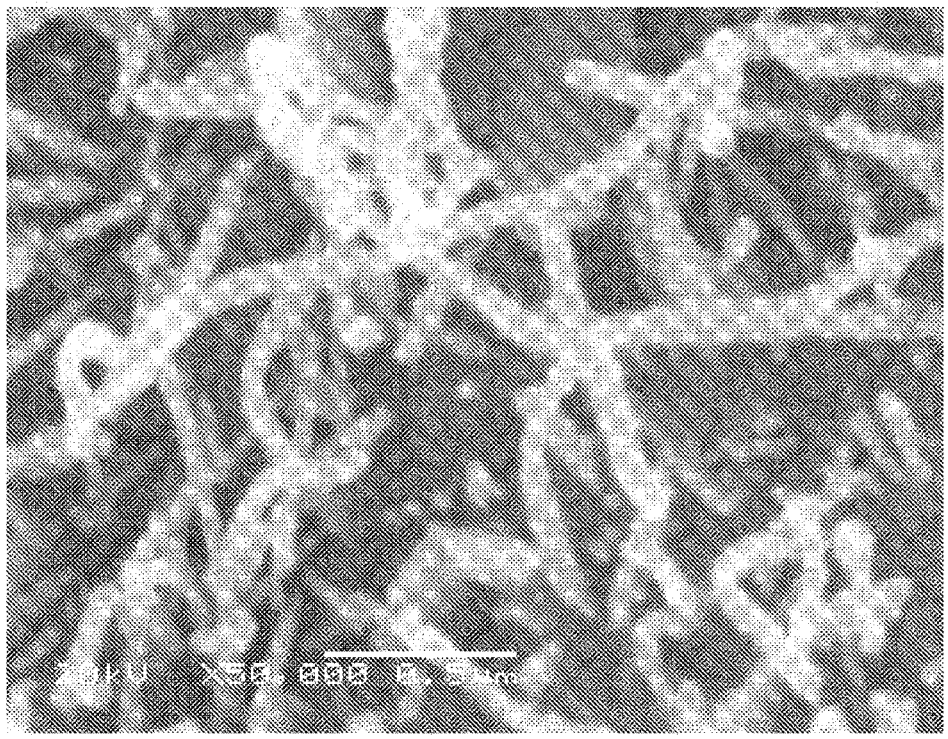
FIG. 3 is a SEM monograph showing the formation of carbon nanotubes when the filter is placed horizontally along the streamlines of the exhaust waste.

A similar filter made out of carbonated steel was polished and placed in the pathway of the exhaust horizontally to the exhaust streamlines. The filter zone was heated using a gas burner. The diesel engine was allowed to run in normal condition for half an hour. The filter material was collected and examined using SEM. FIG. 3 shows SEM monograph showing the formation of carbon nanotubes.

Figure 4:
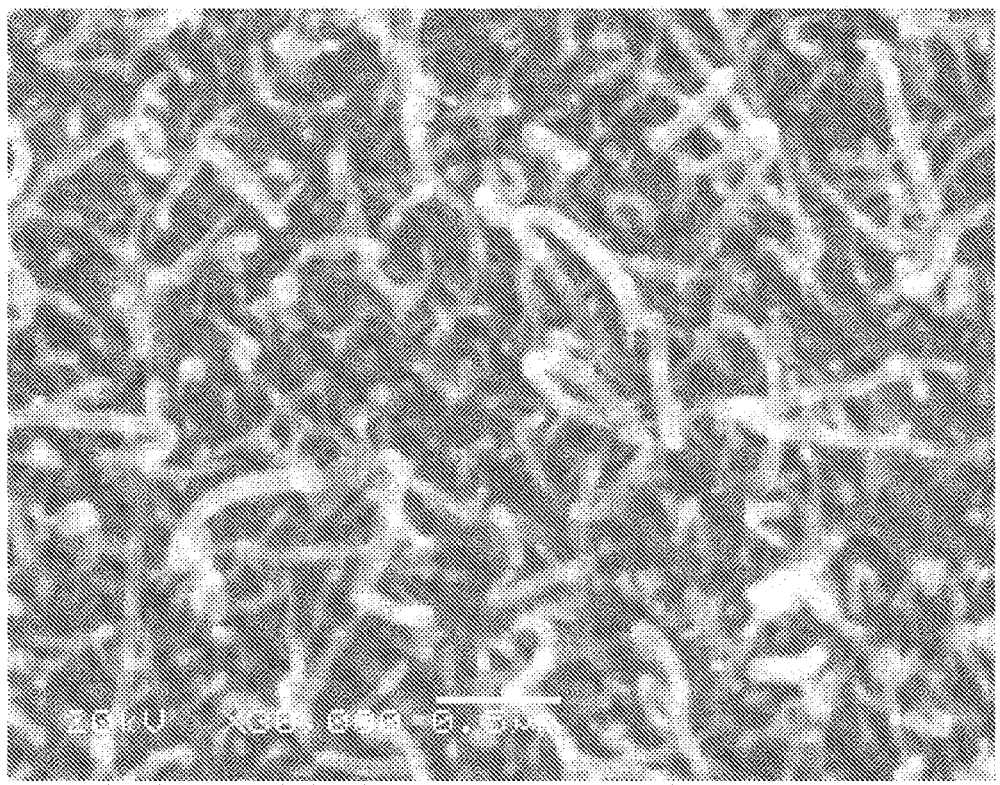
FIG. 4 is a SEM monograph showing the formation of carbon nanotubes when the filter is placed at 5 degrees Celsius from the exhaust streamlines.

A similar filter made out of carbonated steel was polished and placed in the pathway of the exhaust of a diesel engine at an angle of 5 degrees to the streamlines of the exhaust. A diesel engine was allowed to run under normal operating conditions for half an hour. The filter location was heated using a gas burner. The filter was collected an examined using SEM. FIG. 4 shows a monograph of the filter surface with carbon nanotubes formed on the surface. It is noticeable that the angle of 5 degrees influenced the formation of more carbon nanotubes.

The produced carbon nanotubes are purified by immersing the filter plate in a ionic liquid bath. The purification process using ionic liquids produces 95% purified carbon nanotubes. Without limitation to the composition, ionic liquids have the ability to dissolve carbonated materials other than carbon nanotubes leaving a highly purified carbon nanotube stock.

The system and method are not limited to the details of construction or process steps set forth in the following description. Instead, the system and method is capable being practiced or carried out in other ways and via other embodiments of the system.

As used in this specification and the appended claims, the singular forms "a", "an" and "the" include plural referents unless the context clearly indicates otherwise. Thus, for example, reference to "a filter" includes a mixture of two or more filters, and the like.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method of converting exhaust waste of combustion engines to carbon nanotubes within an exhaust system in fluid communication with the combustion engine, comprising:
   generating combustion engine exhaust through combustion of a fuel including an iron salt;
   heating at least one filter to at least 200 degrees Celsius;
   passing combustion engine exhaust past the at least one filter positioned within the exhaust system of the combustion engine, wherein carbon nanotubes form on an exposed surface of the at least one filter; and
   wherein generating combustion engine exhaust through combustion of a fuel including an iron salt comprises generating combustion engine exhaust through combustion of a diesel fuel including the iron salt having a concentration of between one mg of metal salt/ml of fuel and four mg of metal salt/ml of fuel.

2. The method of claim 1, wherein generating combustion engine exhaust through combustion of a fuel including an iron salt comprises generating combustion engine exhaust through combustion of a diesel fuel including the iron salt.

3. The method of claim 1, wherein generating combustion engine exhaust through combustion of a fuel including an iron salt comprises generating combustion engine exhaust through combustion of a diesel fuel including the iron salt, wherein the diesel fuel is formed from a mixture of algal biodiesel fuel and fossil diesel fuel.

4. The method of claim 1, wherein generating combustion engine exhaust through combustion of a fuel including an iron salt comprises generating combustion engine exhaust through combustion of a diesel fuel including the iron salt, wherein the diesel fuel is formed from a mixture of algal biodiesel fuel, ethanol and fossil diesel fuel.

5. The method of claim 1, wherein generating combustion engine exhaust through combustion of a fuel including an iron comprises generating combustion engine exhaust through combustion of a diesel fuel including the iron salt, wherein the diesel fuel is formed from a mixture of between one percent and ten percent algal biodiesel fuel, between one percent and ten percent ethanol and remainder fossil diesel fuel.

6. The method of claim 1, wherein generating combustion engine exhaust through combustion of a fuel including an iron salt comprises generating combustion engine exhaust through combustion of a diesel fuel including the iron salt, wherein the diesel fuel is formed from a mixture of about five percent algal biodiesel fuel, about five percent ethanol and about 90 percent fossil diesel fuel.

7. The method of claim 1, wherein generating combustion engine exhaust through combustion of a fuel including an iron salt comprises generating combustion engine exhaust through combustion of a diesel fuel including the iron salt, wherein the diesel fuel is formed from a mixture of algal biodiesel fuel and fossil diesel fuel.

8. The method of claim 1, wherein generating combustion engine exhaust through combustion of a fuel including an iron salt comprises generating combustion engine exhaust through combustion of a diesel fuel including the iron salt, wherein the diesel fuel is formed from a mixture of algal biodiesel fuel, ethanol and fossil diesel fuel.

9. The method of claim 1, wherein generating combustion engine exhaust through combustion of a fuel including an iron salt comprises generating combustion engine exhaust through combustion of a diesel fuel including the iron salt, wherein the diesel fuel is formed from a mixture of between one percent and ten percent algal biodiesel fuel, between one percent and ten percent ethanol and remainder fossil diesel fuel.

10. The method of claim 1, wherein generating combustion engine exhaust through combustion of a fuel including an iron salt comprises generating combustion engine exhaust through combustion of a diesel fuel including the iron salt, wherein the diesel fuel is formed from a mixture of about five percent algal biodiesel fuel, about five percent ethanol and about 90 percent fossil diesel fuel.

11. The method of claim 1, wherein passing combustion engine exhaust past the at least one filter comprises passing combustion exhaust past a surface formed of iron.

12. The method of claim 1, wherein passing combustion engine exhaust past the at least one filter comprises passing combustion exhaust past a surface formed of carbonated steel.

13. The method of claim 1, wherein passing combustion engine exhaust past the at least one filter comprises passing combustion exhaust past a surface formed of a layer formed from a material selected from a group consisting of iron, nickel and aluminum deposited on a surface.

14. The method of claim 1, wherein passing combustion engine exhaust past the at least one filter comprises passing combustion exhaust past the at least one filter having a surface skewed relative to exhaust flow at an angle less than 45 degrees.

15. The method of claim 1, wherein heating the at least one filter to at least 200 degrees Celsius comprises heating the at least one filter to a temperature between 200-700 degrees C.

16. The method of claim 1, wherein passing combustion engine exhaust past the at least one filter positioned within the exhaust system of the combustion engine, comprises passing combustion engine exhaust past the at least one filter positioned within the exhaust system of the combustion engine such that carbon nanotubes having a diameter of 20-50 nm and a length of 1-10 micrometers form on an exposed surface of the at least one filter.

\* \* \* \* \*